US011821630B2

(12) United States Patent
Hwang

(10) Patent No.: US 11,821,630 B2
(45) Date of Patent: Nov. 21, 2023

(54) SELF-ASSEMBLY BRAZIER

(71) Applicant: Eun Mi Hwang, Wonju-si (KR)

(72) Inventor: Eun Mi Hwang, Wonju-si (KR)

( * ) Notice: Subject to any disclaimer, the term of this patent is extended or adjusted under 35 U.S.C. 154(b) by 297 days.

(21) Appl. No.: 17/339,108

(22) Filed: Jun. 4, 2021

(65) Prior Publication Data
US 2022/0357039 A1    Nov. 10, 2022

(30) Foreign Application Priority Data
May 4, 2021    (KR) .................... 10-2021-0057963

(51) Int. Cl.
  *F24B 1/02*        (2006.01)
  *F24B 1/20*        (2006.01)
  *F24B 3/00*        (2006.01)
  *F24B 13/00*       (2006.01)

(52) U.S. Cl.
  CPC ............. *F24B 1/022* (2013.01); *F24B 1/205* (2013.01); *F24B 3/00* (2013.01); *F24B 13/008* (2013.01)

(58) Field of Classification Search
  CPC .......... F24B 13/02; F24B 13/002; F24B 3/00; F24B 1/181; F24B 1/022; F24B 1/205; A47J 37/07; A47J 37/0763
  See application file for complete search history.

(56) References Cited

U.S. PATENT DOCUMENTS

| | | | | |
|---|---|---|---|---|
| 5,785,046 A | * | 7/1998 | Colla ...................... | F24B 1/202 126/25 R |
| 9,038,620 B2 | * | 5/2015 | Brown .................... | F23B 20/00 126/25 R |
| 10,746,408 B1 | * | 8/2020 | Goin ....................... | F24B 5/028 |
| 10,821,872 B2 | * | 11/2020 | Bates .................... | B60N 3/001 |
| 2012/0318255 A1 | * | 12/2012 | Brown .................... | F23B 20/00 126/25 R |
| 2016/0309662 A1 | * | 10/2016 | Green ..................... | A47J 33/00 |
| 2021/0048188 A1 | * | 2/2021 | Harrington ........... | F24B 13/006 |
| 2021/0063017 A1 | * | 3/2021 | Poggi ..................... | F24B 1/192 |

FOREIGN PATENT DOCUMENTS

| | | |
|---|---|---|
| KR | 20-0469514 | 10/2013 |
| KR | 20-0479870 | 3/2016 |

* cited by examiner

*Primary Examiner* — David J Laux

(57) ABSTRACT

Disclosed herein is a self-assembly brazier. The self-assembly brazier includes: a pair of floor plates arranged bilaterally symmetrical to face each other; a pair of side wall modules having a plurality of side panels disposed to be rotatable, being combined with each other to face each other symmetrically so that a combustion space is formed, and being arranged on upper surfaces of the floor plates to be erected; and a pair of fuel loading parts seated inside lower portions of the side wall modules so that fuel is loaded on the upper surfaces of the fuel loading parts.

4 Claims, 10 Drawing Sheets

SELF-ASSEMBLY BRAZIER

CROSS-REFERENCE TO RELATED APPLICATIONS

This patent application claims priority under 35 U.S.C. § 119 to Korean Patent Application No. 10-2021-0057963 filed on May 4, 2021, the entire contents of which are incorporated by reference herein.

TECHNICAL FIELD

The present invention relates to a self-assembly brazier, and more particularly, to a self-assembly brazier which is easy for a user to assemble and disassemble and can induce complete combustion of fuel.

BACKGROUND

As the number of people who enjoy camping on weekends increases, there is an increase in demand of camping supplies.

A brazier out of such camping supplies is used to heat around the brazier or to cook meat or food by burning firewood or fuel outdoors.

A conventional brazier includes: a main body having a combustion space for burning fuel, such as firewood or charcoal; a grill seated on the main body; and an ashpan disposed below the main body to receive ash generated after burning the fuel.

The conventional brazier is manufactured into a fixed size. Therefore, if a user needs a large-sized brazier, the user has to buy or obtain the large-sized brazier. Moreover, if the user has a plurality of braziers, the braziers occupy lots of volume when being carried or stored.

Moreover, the conventional brazier is inadequately supplied with oxygen necessary for combustion of fuel since outside air is introduced below fuel once. Therefore, the conventional brazier has a disadvantage in that fuel is generally burned incompletely.

In case of the incomplete combustion, carbon monoxide as well as hydrogen and carbon dioxide is generated due to a lack of oxygen, and the incomplete combustion deteriorates thermal efficiency per unit fuel in comparison with complete combustion. Because thermal efficiency is low, temperature of heat is low, cooking time of food gets longer, and fuel consumption is increased.

SUMMARY

Accordingly, the present invention has been made to solve the above-mentioned problems occurring in the prior arts, and it is an object of the present invention to provide a self-assembly brazier, which is easy to be carried and stored.

It is another object of the present invention to provide a self-assembly brazier, which can induce complete combustion of fuel by an internal panel attached simply.

To accomplish the above object, according to the present invention, there is provided a self-assembly brazier including: a pair of floor plates arranged bilaterally symmetrical to face each other; a pair of side wall modules having a plurality of side panels disposed to be rotatable, being combined with each other to face each other symmetrically so that a combustion space is formed, and being arranged on upper surfaces of the floor plates to be erected; and a pair of fuel loading parts seated inside lower portions of the side wall modules so that fuel is loaded on the upper surfaces of the fuel loading parts.

The self-assembly brazier according to the present invention is used when the user assembles a pair of floor plates, a pair of side wall modules, a pair of fuel loading parts, and a plurality of internal panels.

The self-assembly brazier according to the present invention is easy to be assembled and disassembled since a pair of the modules are assembled with each other by just one assembly process of the floor plates, the side wall modules, and the fuel loading parts without repetition of assembly processes.

Moreover, the self-assembly brazier according to the present invention can enhance combustion efficiency by inducing complete combustion of the fuel since the internal panels are combined according to the user's selection.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an embodiment of the present invention will be described in detail with reference to the accompanying drawings.

Figure 1:
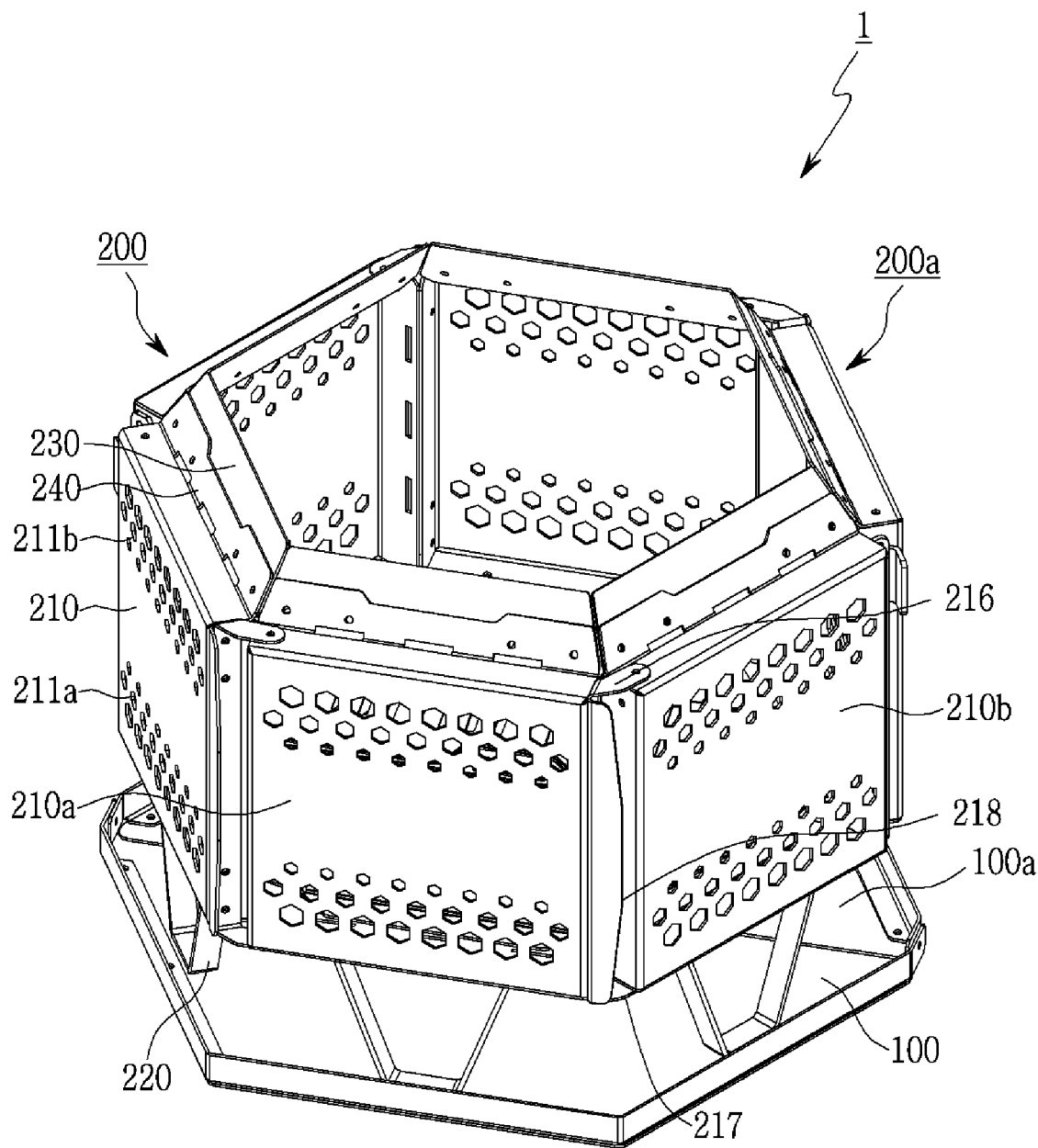
FIG. 1 is a perspective view showing an assembled state of a self-assembly brazier according to an embodiment of the present invention.
Figure 2:
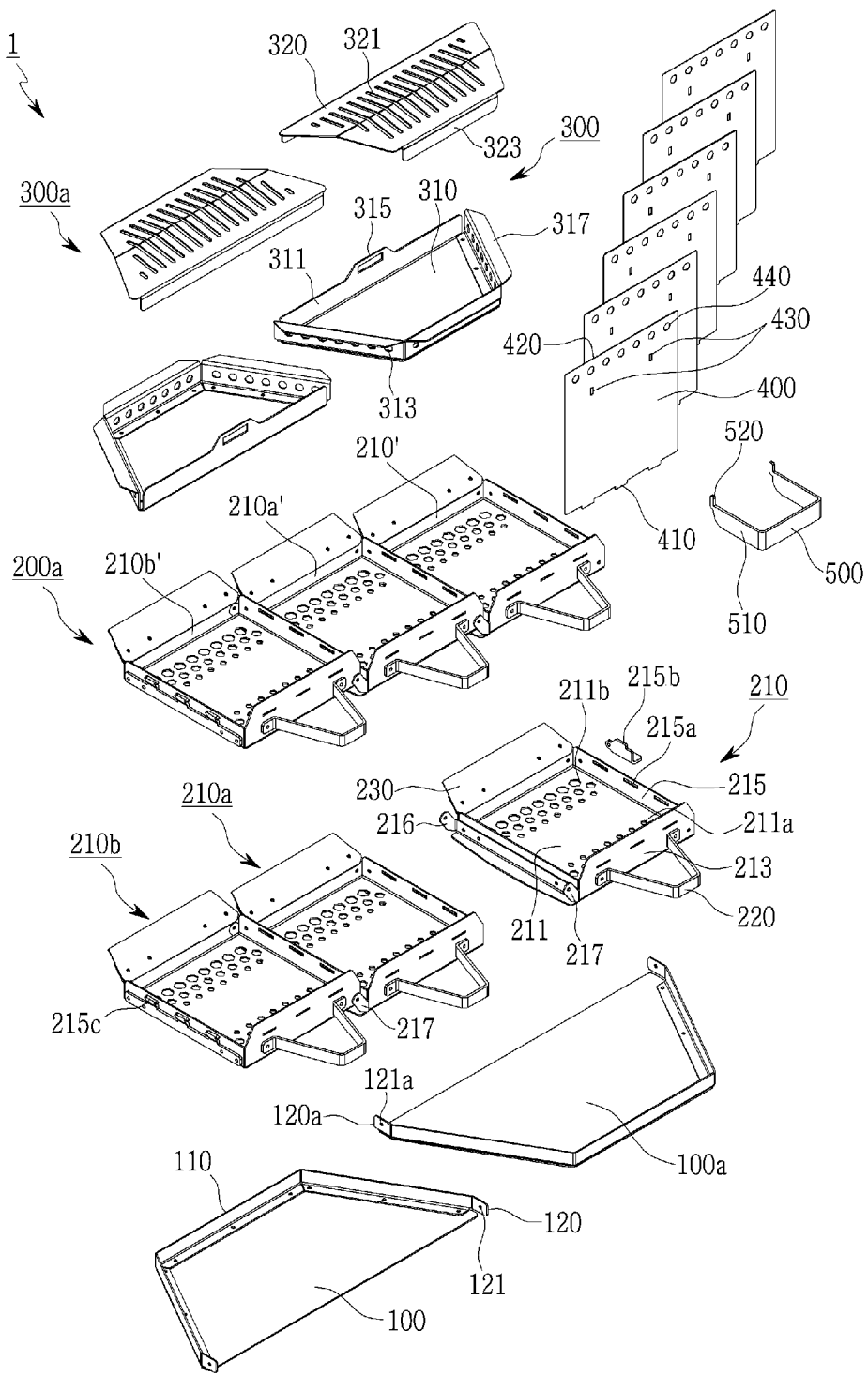
FIG. 2 is an exploded perspective view showing a disassembled state of the self-assembly brazier according to the embodiment of the present invention.

FIG. 1 is a perspective view showing an assembled state of a self-assembly brazier 1 according to an embodiment of the present invention, FIG. 2 is an exploded perspective view showing a disassembled state of the self-assembly brazier 1 according to the embodiment of the present invention, and FIGS. 3 to 6 are exemplary views showing an assembly process of the self-assembly brazier 1 according to the embodiment of the present invention.

As shown in FIG. 2, the self-assembly brazier 1 according to the embodiment of the present invention includes: a pair of floor plates 100 and 100a mounted on the floor; a pair of side wall modules 200 and 200a assembled with each other and arranged to stand up on the floor plates 100 and 100a to form a space where fuel is burned; a pair of fuel loading parts 300 seated at lower portions inside a pair of the side wall modules 200 and 200a combined with each other so that fuel is loaded; and a plurality of internal panels 400 selectively combined with the side wall modules 200 and 200*a*.

Here, the self-assembly brazier 1 according to the embodiment of the present invention is formed in a hexagonal shape in cross section, and a pair of the floor plates 100 and 100*a*, a pair of the side wall modules 200 and 200*a*, and a pair of the fuel loading parts 300 have the shape that a hexagon is divided in half.

However, the above is just an example, and the self-assembly brazier 1 may be formed in one of polygonal shapes, such as a rectangle, an octagon, and a decagon, which may be divided to be bilaterally symmetrical.

A pair of the floor plates 100 and 100*a* are assembled with each other and are arranged on the ground so that fuel is burned in the combustion space formed by the side wall modules 200 and 200*a* and the fuel loading parts 300 and it is prevented that generated heat is transferred to the ground.

Figure 3:
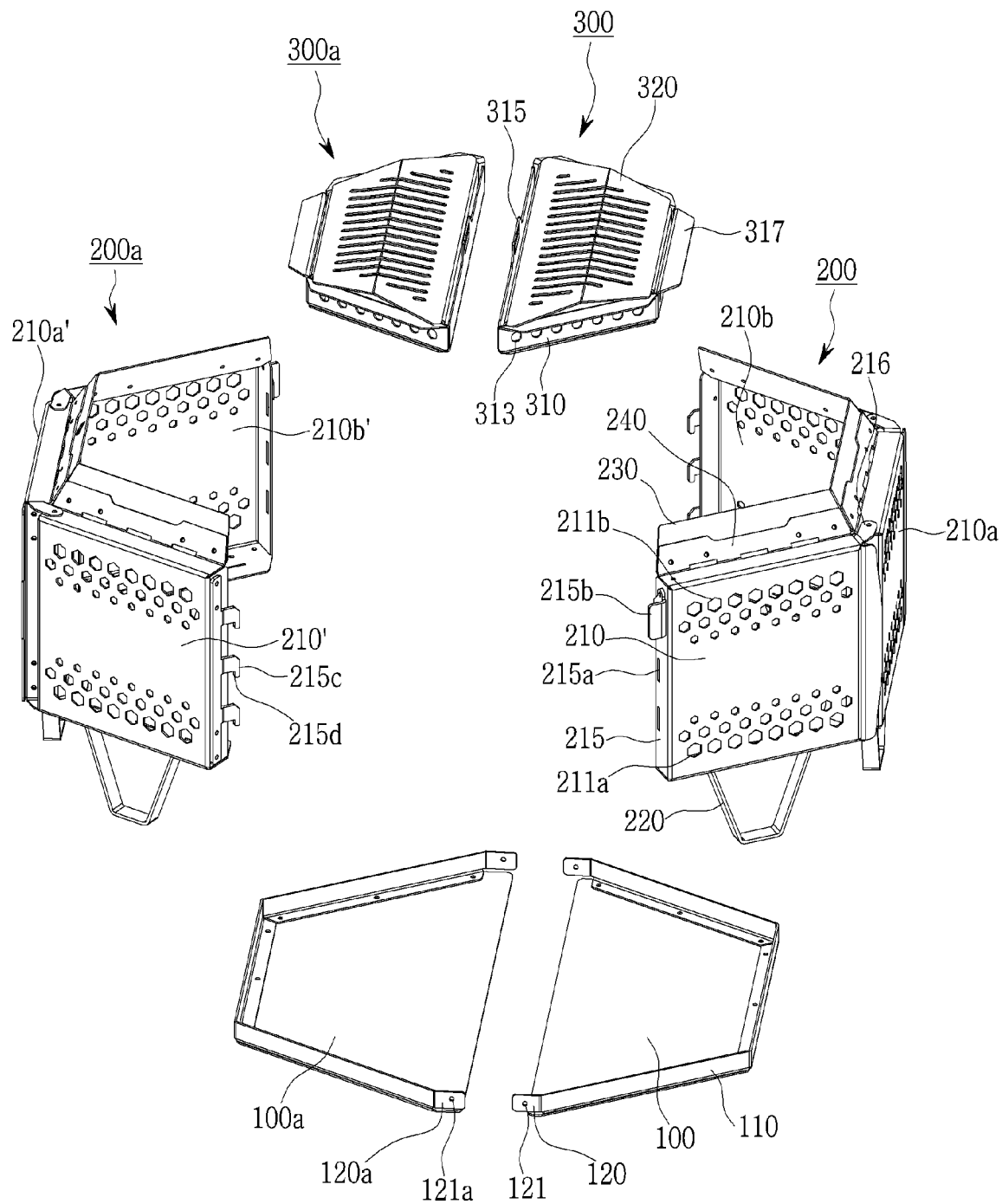
FIGS. 3 to 6 are exemplary views showing an assembly process of the self-assembly brazier according to the embodiment of the present invention.

A pair of the floor plates 100 and 100*a* is formed in a trapezoidal shape divided into half, and are combined with each other to face each other as shown in FIG. 3. A side wall 110 formed vertically to a predetermined height is disposed on an edge area of each of the floor plates 100 and 100*a*. Furthermore, a pair of combining brackets 120 and 120*a* are disposed at end portions of the side walls 110.

Figure 4:
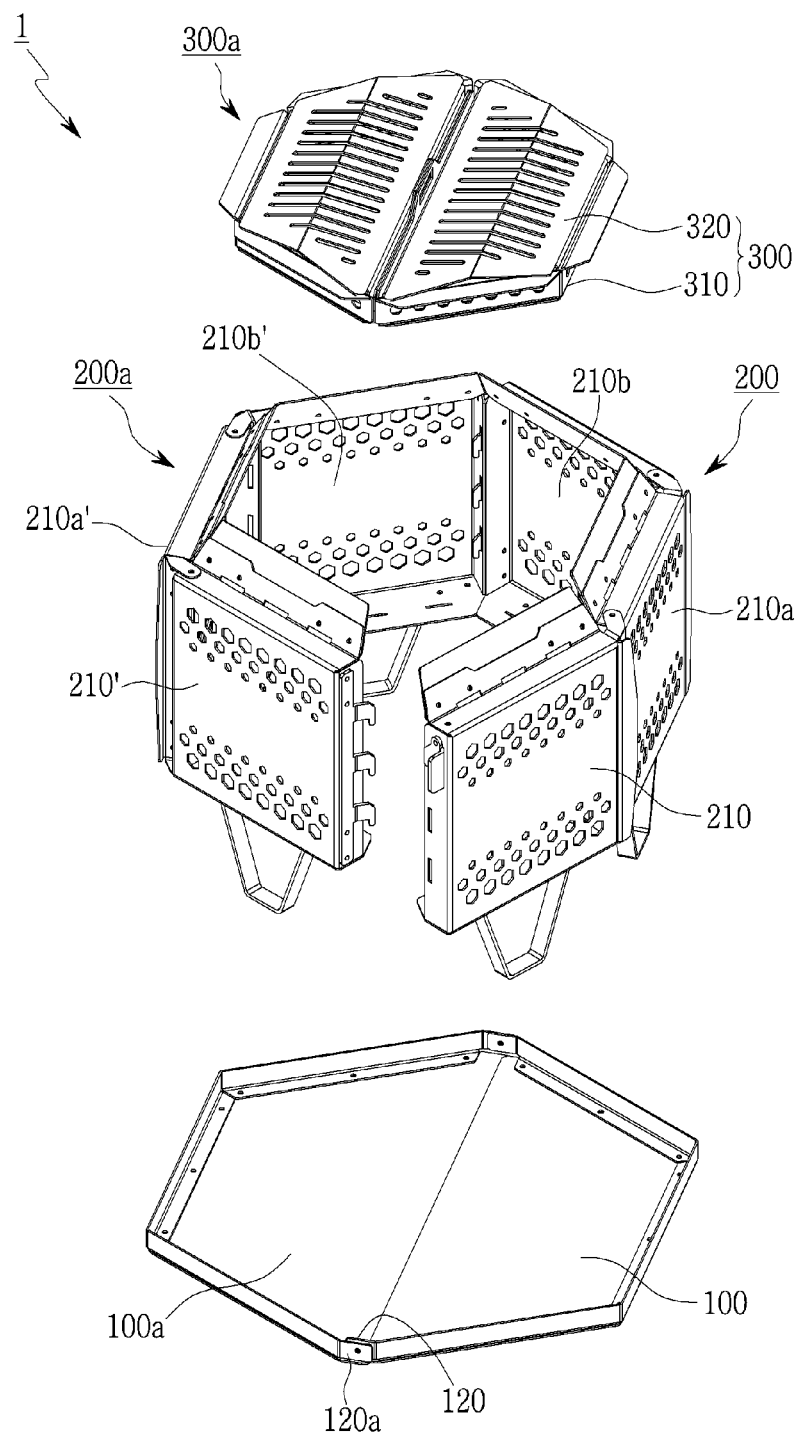

When the first floor plate 100 and the second floor plate 100*a* are combined with each other as shown in FIG. 3, the first combining bracket 120 and the second combining bracket 120*a* are arranged to face each other, and the first combining bracket 120 and the second combining bracket 120*a* are arranged to overlap each other as shown in FIG. 4. Additionally, when a coupling member (not shown) is inserted into a first insertion hole 121 and a second insertion hole 121*a*, the combined state of the first floor plate 100 and the second floor plate 100*a* can be maintained stably.

A pair of the side wall modules 200 and 200*a* are assembled with each other to form a combustion space of a hexagonal prism shape which is opened vertically. Because a pair of the side wall modules 200 and 200*a* are formed equivalently, only the first side wall module 200 will be described.

As shown in FIG. 2, the first side wall module 200 includes: three side panels 210, 210*a* and 210*b* which form sides of a hexagon; support legs 220 joined to lower portions of the side panels 210, 210*a* and 210*b* and erected on the floor plates 100 and 100*a* to support the side panels; flame guide plates 230 combined with upper portions of the side panels 210, 210*a* and 210*b* to be inclined inwardly to inwardly guide flames generated during combustion of the fuel; and guide plate reinforcing plates 240 formed on the rear surfaces of the flame guide plates 230 to reinforce the flame guide plates 230.

The three side panels 210, 210*a* and 210*b* are connected with one another to be rotatable. If the self-assembly brazier 1 is not used, as shown in FIG. 2, the first side wall module 200 and the second side wall module 200*a* are spread and stacked one on top of the other to be stored.

If the self-assembly brazier 1 is used, as shown in FIG. 3, the three side panels 210, 210*a* and 210*b* are rotated at a predetermined angle and are adjusted to have a polygonal shape.

Each of the side panels 210, 210*a* and 210*b* includes: a side panel body 211; a lower support plate 213 combined with a lower portion of the side panel body 211 to extend inwardly so that an ashpan 310 is held; a pair of side combining wings 215 formed at both sides of the side panel body 211 inwardly to a predetermined height; a lower rotation support bar 217 and an upper rotation support bar 216 for rotatably supporting the neighboring side panels 210, 210*a* and 210*b*; and an external connection cover 218 for covering the exterior of combined areas of the neighboring side panels 210, 210*a* and 210*b*.

The side panel body 211 is a metal plate having a predetermined area. Preferably, the side panel body 211 is made of a material with excellent durability not to be thermally transformed even though the side panel body 211 is exposed to flames of high temperature for a long period of time.

A plurality of lower air inflow holes 211*a* and a plurality of upper air inflow holes 211*b* are perforated through the plate surface of the side panel body 211. As shown in FIG. 1, when the fuel M is burned, the lower air inflow holes 211*a* and the upper air inflow holes 211*b* supply outside air A to the fuel M so that the fuel M is burned.

The lower support plate 213 extends inwardly from the lower portion of the side panel body 211 to have a predetermined area so that the fuel loading part 300 is held thereon, and is combined with the internal panel 400 to form an air movement space where outside air moves.

Figure 7:
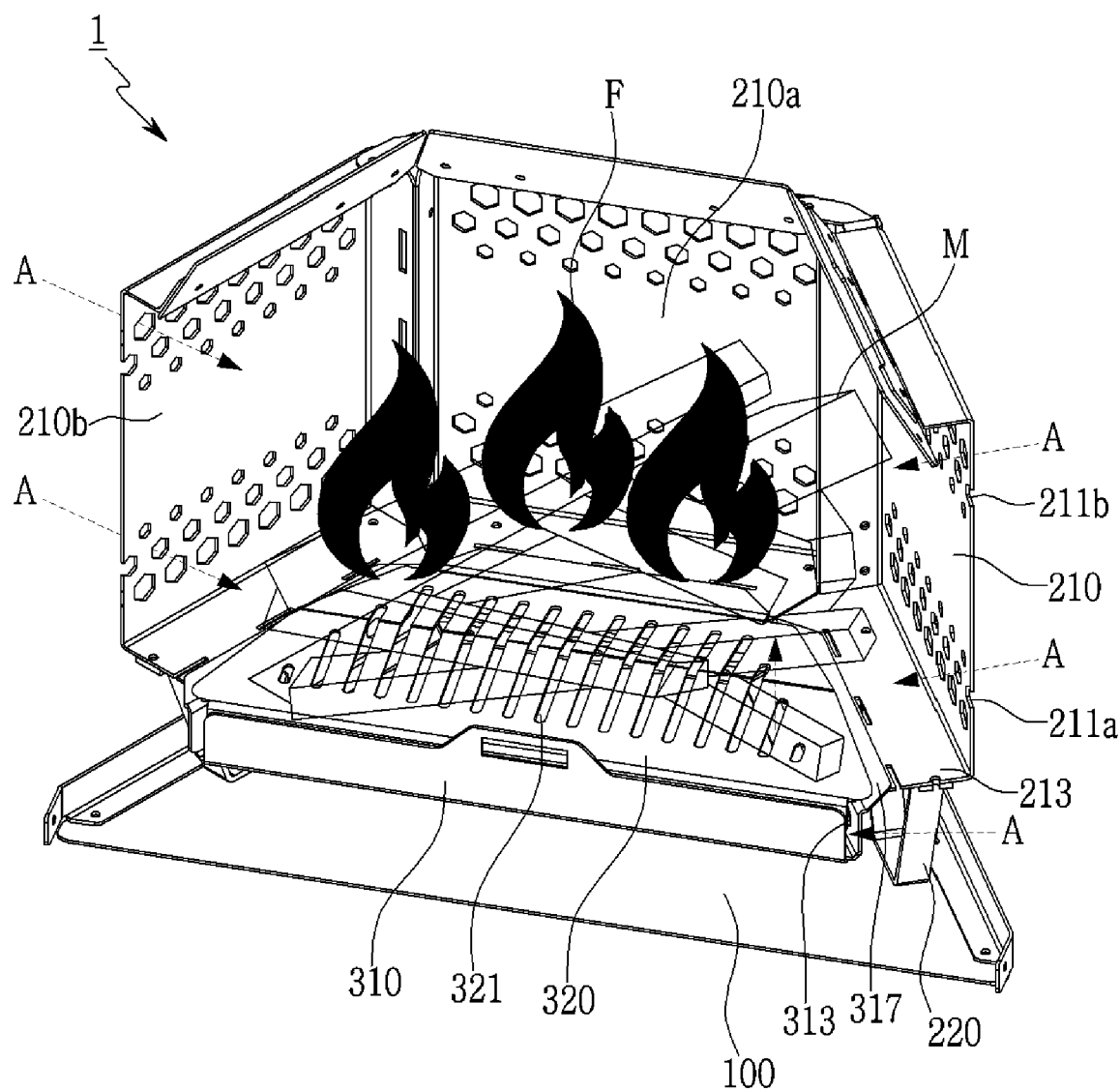
FIG. 7 is an exemplary view showing a process of burning fuel by the self-assembly brazier according to the embodiment of the present invention.

As shown in FIG. 7, the lower support plate 213 extends from the lower end of the side panel body 211 to be inclined downwardly at a predetermined angle. A holding wing 317 of the ashpan 310 is held at an internal end portion of the lower support plate 213 so that the fuel loading part 300 can be combined with the lower portions of the side wall modules 200 and 200*a*.

A plurality of internal panel combining grooves 213*a* are formed in the plate surface of the lower support plate 213. A plurality of lower fitting protrusions 410 of the internal panel 400 are fit into the internal panel combining grooves 213*a* when the internal panel 400 is joined to the side panels 210, 210*a* and 210*b*.

Figure 10:
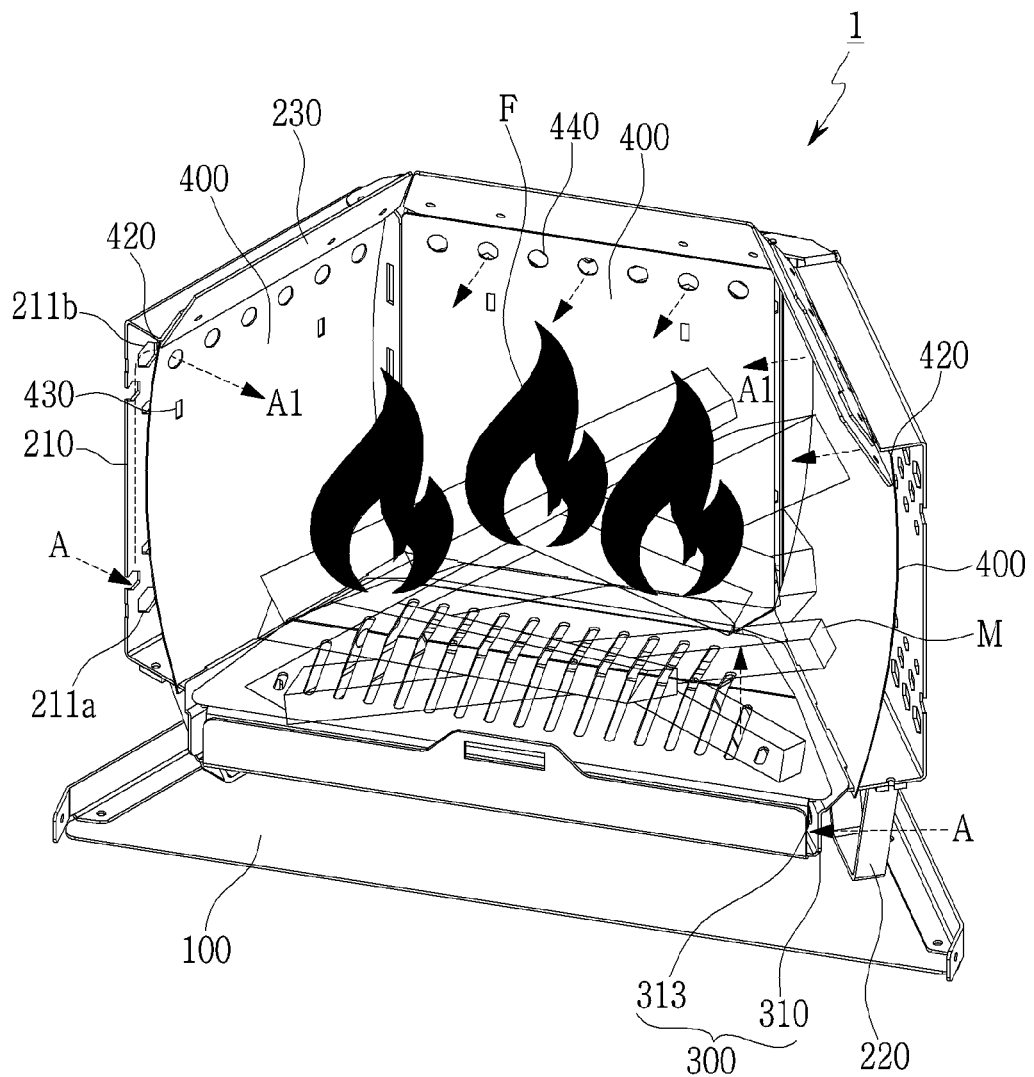
FIG. 10 is an exemplary view showing a process of burning fuel in the self-assembly brazier with which the internal panel is combined.

The side combining wings 215 are formed at both sides of the side panel body 211 inwardly to a predetermined height. As shown in FIG. 8, the side combining wings 215 block both sides of the internal panel 400 when the internal panel 400 is joined to the side panels 210, 210*a* and 210*b*. Therefore, as shown in FIG. 10, when the internal panel 400 is joined to the side panels, the air movement space is formed between the side panels 210, 210*a* and 210*b* and the internal panel 400.

Meanwhile, the side combining wings 215 of the first side panel 210 and the third side panel 210*b*, which are disposed at the outermost parts, among the three side panels 210, 210*a* and 210*b* of the first side wall module 200 have combining means to be combined with the second side wall module 200*a*.

As shown in FIG. 3, a plurality of fitting grooves 215*a* are formed in the external side combining wing 215 of the first side panel 210 at a predetermined height, and a combined state locking lever 215*b* is rotatably disposed at an upper portion of the external side combining wing 215 to lock the combined state of the first side wall module 200 and the second side wall module 200*a*.

In the meantime, the third side panel 210*b* of the first side wall module 200 has a plurality of fitting bars 215*c* disposed in a vertical direction. A fitting hook 215*d* is formed at an end portion of each fitting bar 215*c* to be bent so as to keep the fitting state of the fitting bar.

The fitting grooves 215*a* and the combined state locking lever 215*b* of the first side panel 210 of the first side wall module 200 are also formed on the third side panel 210*b'* of the second side wall module 200*a* in the same way, the fitting bars 215*c* formed on the third side panel 210*b* of the first side wall module 200 are also formed on the first side panel 210' of the second side wall module 200a in the same way.

Figure 5A:
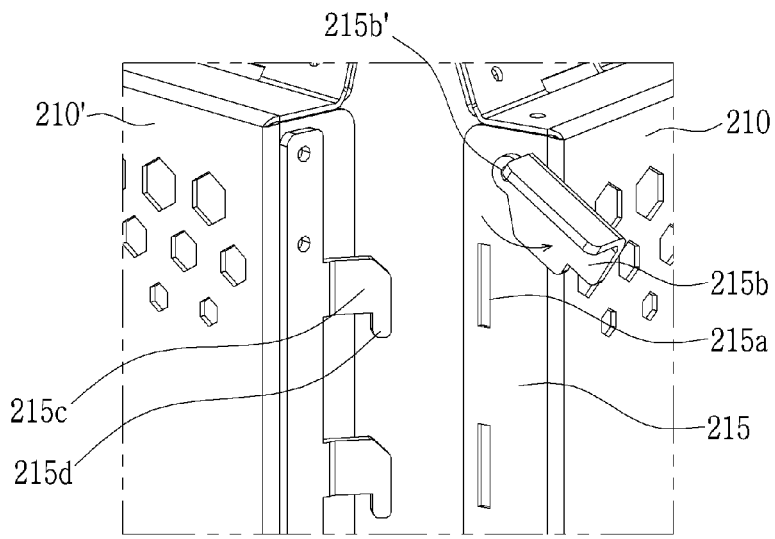

As shown in FIG. 5A, when the first side wall module 200 and the second side wall module 200a are combined with each other, the fitting bars 215c of the first side panel 210' of the second side wall module 200a are fit to the fitting grooves 215a of the first side panel 210 of the first side wall module 200.

When a user inserts the fitting bars 215c into the fitting grooves 215a while holding the first side panel 210' up and takes down the first side panel 210' to its original state, the fitting hooks 215d of the fitting bars 215c are caught to the inner wall surfaces of the fitting grooves 215a to be fixed in their position.

Figure 5B:
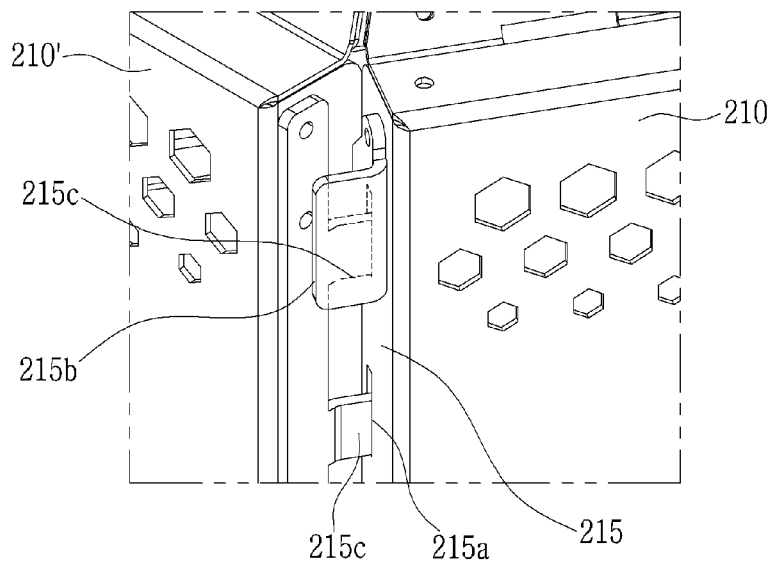

When the combination of all of the fitting bars 215c is completed, the user inwardly rotates the combined state locking lever 215b, which was rotated outwardly, around a lever rotary shaft 215b'. Therefore, as shown in FIG. 5B, the combined state locking lever 215b blocks a route where the uppermost fitting bar 215c is separated in order to prevent separation of the fitting bar 215c. Therefore, the combined state of the first side wall module 200 and the second side wall module 200a can be maintained stably.

The upper rotation support bar 216 and the lower rotation support bar 217 connect the neighboring side panels 210, 210a and 210b with one another to be rotatable. As shown in FIG. 1, the upper rotation support bar 216 and the lower rotation support bar 217 are respectively combined with the upper portion and the lower portion of the combined part between the second side panel 210a and the third side panel 210b to support rotation of the upper rotation support bar 216 and the lower rotation support bar 217 at a predetermined angle.

The external connection cover 218 is disposed on the outer face of the combined area of the neighboring side panels 210, 210a and 210b in order to block that heat is directly exposed out through the combined area. As shown in FIG. 1, the external connection cover 218 covers a gap between the second side panel 210a and the third side panel 210b which are bent at a predetermined angle, so as to prevent flames and heat from being transferred externally through the gap.

Moreover, the external connection cover 218 is formed on the second side panel 210a horizontally to limit the rotational angle of the third side panel 210b. That is, when the third side panel 210b is rotated externally, it touches the external connection cover 218, so that the third side panel 210b is limited to be rotated up to an angle which is horizontal to the second side panel 210a.

The support legs 220 are joined to the lower portions of the side panels 210, 210a and 210b in a trapezoidal shape, and support a pair of the side wall modules 200 and 200a to be erected on the floor plates 100 and 100a. Besides the illustrated shape, the shape of the support legs 220 may be changed in various ways within a range to be erected while supporting weight of the fuel loaded in the side wall modules.

The flame guide plates 230 are combined with the upper portions of the side panels 210, 210a and 210b to be inclined inwardly at the predetermined angle. That is, as shown in FIG. 7, when the fuel M loaded on the fuel loading plates 320 is burned and flames F are generated, the flame guide plates 230 guide the flames to be gathered at the central area without spreading externally.

The flame guide plates 230 are formed in a plate shape having a predetermined area and are formed to be inclined toward the center.

The guide plate reinforcing plates 240 are combined with the rear surfaces of the flame guide plates 230 to reinforce the flame guide plates 230. As shown in FIG. 1, the guide plate reinforcing plates 240 are combined with the upper portions of the side panels 210, 210a and 210b to reinforce intensity of the flame guide plates 230 and prevent deformation of the flame guide plates 230 so that the flame guide plates 230 can maintain the inclination angle and guide the flames.

A pair of the fuel loading parts 300 are respectively put on the lower portion of the inside of the side wall modules 200 and 200a so that the fuel M can be loaded and supported. As shown in FIG. 2, the fuel loading part 300 includes the ashpan 310, and the fuel loading plate 320 joined to the top of the ashpan 310.

A pair of the ashpans 310 has the size to be held in an internal space formed by a pair of the side wall modules 200 and 200a. Each of the ashpans 310 has an ashpan side wall 311 with a predetermined height formed along the edge.

Air inflow holes 313 for inducing outside air A are formed in an area where the ashpan side walls 311 touch the side wall modules 200 and 200a. As shown in FIG. 7, the air inflow holes 313 make outside air A supplied below the fuel M when the fuel M is burned.

Separable insertion holes 315 are formed in areas where a pair of the ashpans 310 touch each other. In order to discharge ash after combustion of the fuel M is completed, the user inserts separation members into the separable insertion holes 315 in order to separate the ashpans 310 externally.

Meanwhile, holding wings 317 extending externally to have a predetermined area are formed at upper portions of the ashpan side walls 311. The holding wings 317 are held on the lower support plates 213 of the side panels 210, 210', 210a, 210a', 210b and 210b' so that the ashpans 310 are fixed at the lower portions of the side wall modules 200 and 200a.

Preferably, the holding wings 317 have an area to be put on the lower support plates 213 while getting in contact with the lower support plates 213 in a predetermined area.

Each of the fuel loading plates 320 is combined with the upper portion of the ashpan 310, and the fuel M is loaded on the upper surface of the fuel loading plate 320. The fuel loading plate 320 has the same area as the ashpan 310 and includes ash discharge holes 321 perforated through the plate surface. The ash discharge holes 321 fall ash to the ashpans 310 and supply air induced into the air inflow holes 313 to the fuel M.

Separation legs 323 which are bent vertically and downwardly and get in contact with the ashpans 310 to be supported are disposed at both sides of the fuel loading plates 320. The fuel loading plates 320 can be spaced apart from the ashpans 310 to a predetermined height by the separation legs 323.

Referring to FIGS. 1 to 7, an assembly process and a use process of the self-assembly brazier 1 according to the present invention will be described.

Before use of the self-assembly brazier 1, as shown in FIG. 2, a pair of the floor plates 100 and 100a, a pair of the side wall modules 200 and 200a, a pair of the fuel loading parts 300, and a plurality of the internal panels 400 are stored in a stacked state.

In order to use the self-assembly brazier 1, as shown in FIG. 3, first, the user arranges a pair of the floor plates 100 and 100a to face each other, and arranges the first combining brackets 120 and 120a and the second combining brackets 120 and 120a to be overlapped, so that the floor plates 100 and 100a are combined with each other.

Furthermore, the user rotates the side panels 210, 210', 210a, 210a', 210b and 210b' of the first side wall module 200 and the second side wall module 200a to form a hexagon. The user locates the first side wall module 200 and the second side wall module 200a to face each other, inserts the fitting bars 215c into the fitting grooves 215a and rotates the combined state locking lever 215b as shown in FIGS. 5A and 5B. Then, assembly of the side wall modules is completed.

Figure 6:
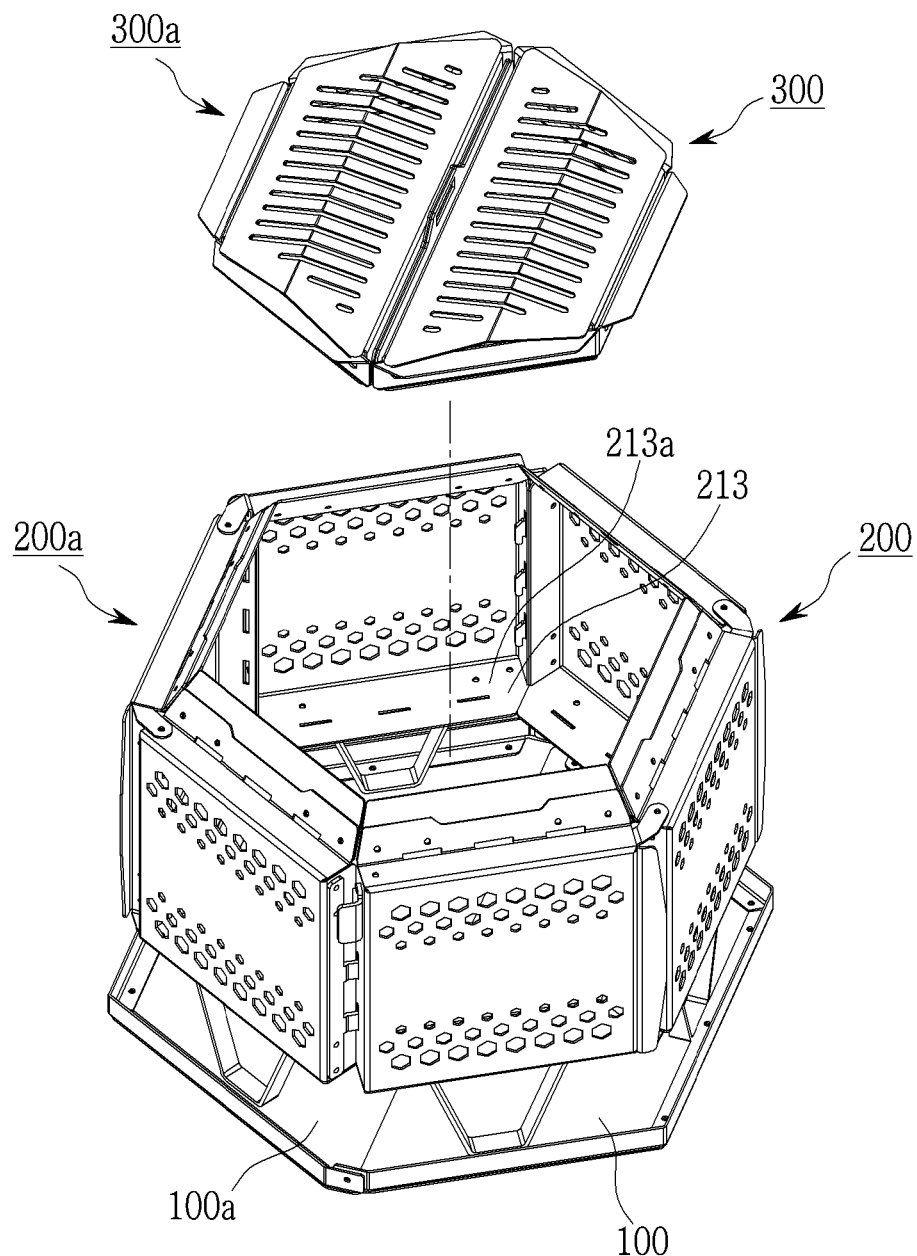

As shown in FIG. 6, the first side wall module 200 and the second side wall module 200a which are assembled with each other are arranged on a pair of the floor plates 100 and 100a to be erected, and a pair of the fuel loading parts 300 are inserted into the assembled side wall modules.

The user puts the holding wings 317 of the fuel loading parts 300 on the lower support plates 213 of the side wall modules 200 and 200a so that a pair of the fuel loading parts 300 are joined to the inside of the side wall modules 200 and 200a.

When the fuel loading parts 300 are combined completely, the user loads fuel M on the upper surfaces of the fuel loading plates 320. The user lights the fuel M after loading the fuel M like firewood or charcoal.

When the fuel M is lighted, as shown in FIG. 7, outside air A is supplied below the fuel M through the air inflow holes 313 and the ash discharge holes 321 of the ashpans 310, and outside air A is supplied into the lower air inflow holes 211a and the upper air inflow holes 211b of the side panels 210, 210', 210a, 210a', 210b and 210b', so that the fuel M is burned.

When combustion of the fuel M is completed, the user discharges out the fuel loading parts 300 using the separation member (not shown), removes the ashpans 310 and the fuel loading plates 320, and then, emits ash.

Additionally, the user rotates the combined state locking lever 215b externally, separates the fitting bars 215c from the fitting grooves 215a, and then, separates the first side wall module 200 and the second side wall module 200a from each other.

In the meantime, in order to enhance combustion efficiency of the fuel, a plurality of the internal panels 400 are combined with the first side wall module 200 and the second side wall module 200a.

As shown in FIG. 2, the internal panels 400 are made with a plate-shaped material, and are joined among the side panel bodies 211, the lower support plates 213 and the right and left side combining wings 215. A plurality of lower fitting protrusions 410 forcedly fit into the internal panel combining grooves 213a of the lower support plates 213 are disposed at the lower portion of the internal panel 400.

A plurality of inside air discharge holes 440 are formed in the plate surface of the upper end of the internal panel 400. The inside air discharge holes 440 emit inside air A1 with temperature, which is induced into the lower air inflow holes 211a and the upper air inflow holes 211b of the side panels 210, 210', 210a, 210a', 210b and 210b' and is elevated by touching heat generated by combustion of the fuel M in the air movement space, toward the fuel M.

Figure 8A:
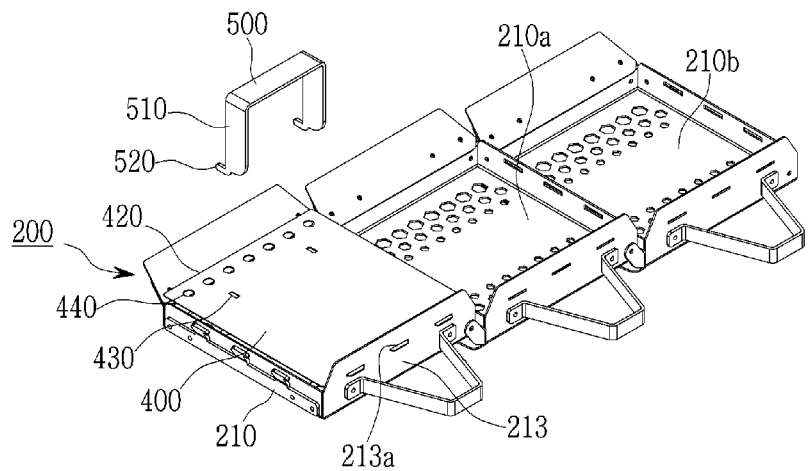
FIGS. 8A, 8B, 8C, 9A, 9B and 9C are exemplary views showing a process of assembling an internal panel to the self-assembly brazier according to the embodiment of the present invention.
Figure 8B:
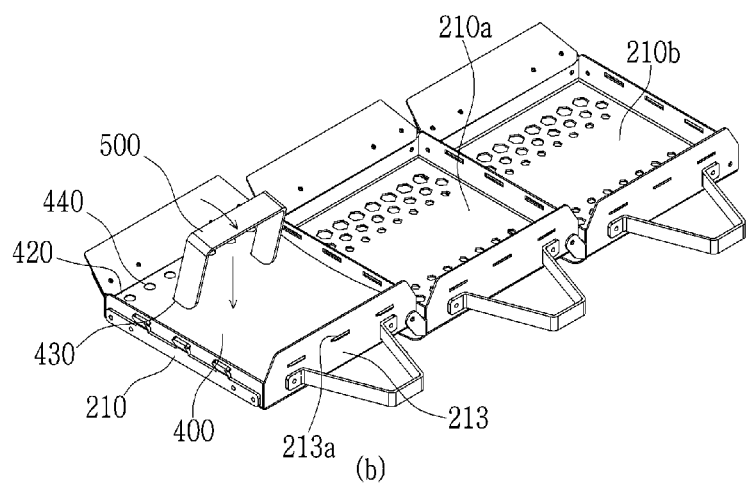
Figure 8C:
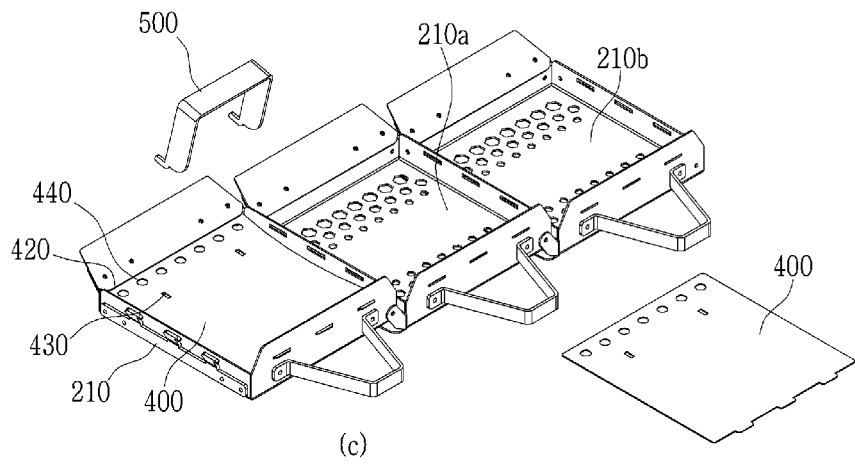

Referring to FIG. 8C, a pair of jig combining holes 430 are formed at right and left sides below the inside air discharge holes 440. A panel removable jig 500 is inserted into the jig combining holes 430 in order to fix the internal panel 400 to the side panels 210, 210', 210a, 210a', 210b and 210b'.

The internal panel 400 is formed to be higher than the side panel body 211. Therefore, the user presses an upper end 420 of the internal panel 400 and inserts the internal panel 400 into a lower end 231 of the flame guide plate 230 to fix the position.

As shown in FIG. 8A, the user inserts the lower fitting protrusions 410 into the internal panel combining grooves 213a of the lower support plate 213. In this instance, as shown in FIG. 9A, the upper end 420 of the internal panel 400 is located on the plate surface of the flame guide plate 230 to be overlapped at a predetermined height.

Figure 9B:
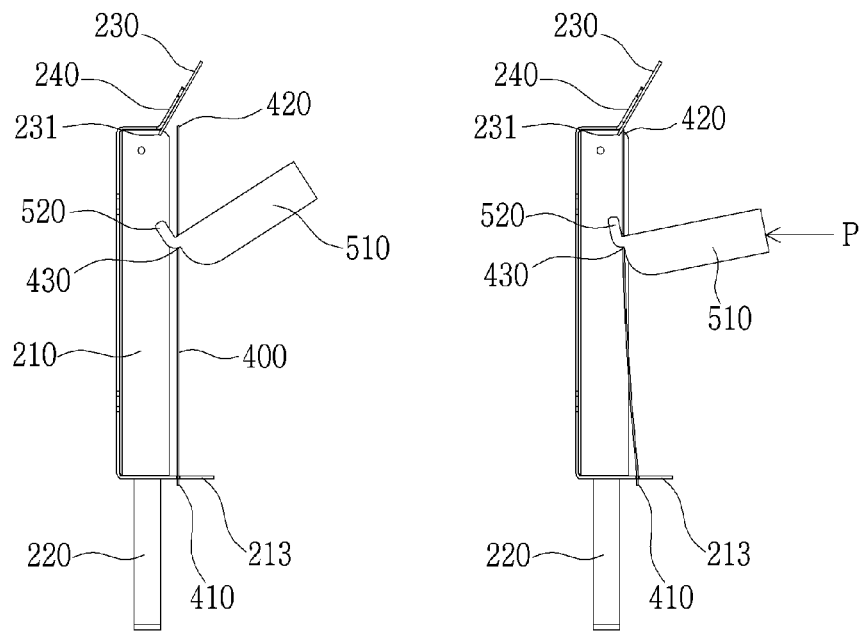
Figure 9A:
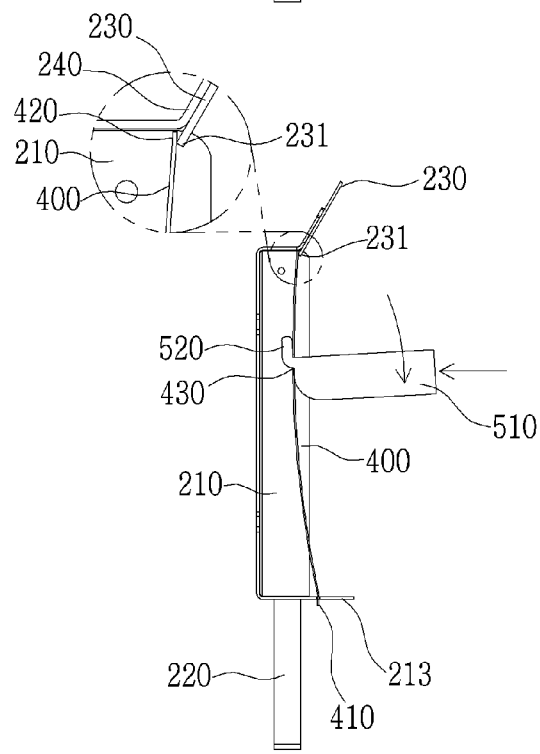

In the above state, as shown in FIGS. 8B and 9B, pressing protrusions 520 of the panel removable jig 500 are inserted into the jig combining holes 430.

Figure 9C:
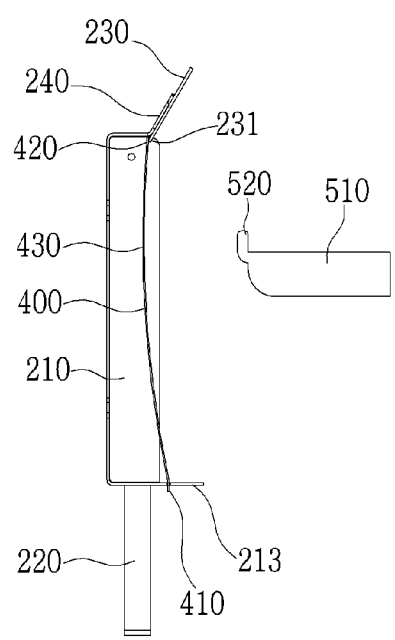

As shown in FIG. 9C, the user rotates the panel removable jig 500 downwardly in the state where the pressing protrusions 520 are pressed slantly, so that the upper end 420 of the internal panel 400 gets in contact with the inner face of the lower end 231 of the flame guide plate 230 to be supported.

The lower portion of the internal panel 400 is combined with the internal panel combining grooves 213a of the lower support plate 213, and the upper end gets in contact with the inner face of the lower end 231 of the flame guide plate 230 to be supported, so that the internal panel 400 is bent inwardly to form a curved surface and is fixed to the side panels 210, 210', 210a, 210a', 210b and 210b'. The curved surface formed on the internal panel 400 can minimize thermal deformation of the internal panel 400 by transferring heat to all areas uniformly when the heat generated by flames is transferred to the internal panel 400.

When the internal panel 400 is fixed to the side panels 210, 210', 210a, 210a', 210b and 210b', the air movement space is formed between the internal panel 400 and the side panel body 211. As shown in FIG. 10, when the fuel M loaded starts to be burned, outside air A is not directly transferred to the fuel M through the lower air inflow holes 211a and the upper air inflow holes 211b but is discharged through the inside air discharge holes 440 after moving a predetermined distance through the air movement space.

When the outside air moves along the air movement space and heat generated by combustion of the fuel M is transferred, temperature of the outside air rises. The inside air A1 with elevated temperature is supplied to the fuel M through the inside air discharge holes 440.

The fuel M is first burned by the outside air A supplied below the fuel M through the fuel loading plates 320. After that, when the inside air A1 with elevated temperature is supplied to the fuel M and combustion gas from above, the fuel M is second burned. Such second combustion induces complete combustion of the fuel M. When the fuel M is burned completely, temperature of flames rises and thermal efficiency is enhanced.

Therefore, in comparison with a combustion process carried out in a state where the internal panel 400 of FIG. 7 is not combined, the above complete combustion enhances combustion efficiency.

As described above, the self-assembly brazier according to the present invention is used when the user assembles a pair of floor plates, a pair of side wall modules, a pair of fuel loading parts, and a plurality of internal panels.

The self-assembly brazier according to the present invention is easy to be assembled and disassembled since a pair of the modules are assembled with each other by just one assembly process of the floor plates, the side wall modules, and the fuel loading parts without repetition of assembly processes.

Moreover, the self-assembly brazier according to the present invention can enhance combustion efficiency by inducing complete combustion of the fuel since the internal panels are combined according to the user's selection.

The technical thoughts of the present invention have been described hereinafter.

It is to be appreciated that those skilled in the art can change or modify the embodiments from the above description in various ways. Although it is not clearly illustrated or described herein, it is to be appreciated that those skilled in the art can change or modify the embodiments from the above description in various ways without departing from the scope and spirit of the present invention and such changes and modifications belong to the scope of the present invention. While the present invention has been described with reference to the particular illustrative embodiments, it is not to be restricted by the embodiments but only by the appended claims.

What is claimed is:

1. A self-assembly brazier comprising:
   a pair of floor plates arranged bilaterally symmetrical to face each other;
   a pair of side wall modules having a plurality of side panels disposed to be rotatable, being combined with each other to face each other symmetrically so that a combustion space is formed, and being arranged on upper surfaces of the floor plates to be erected; and
   a pair of fuel loading parts seated inside lower portions of the side wall modules so that fuel is loaded on the upper surfaces of the fuel loading parts.

2. The self-assembly brazier according to claim 1, wherein each of the side wall modules comprises:
   a plurality of side panels;
   a lower rotation support bar and an upper rotation support bar combined with upper and lower portions of the neighboring side panels to rotatably support the neighboring side panels;
   support legs combined with lower portions of the side panels and erected on the floor plates to support the side panels; and
   a flame guide plate combined with the upper portions of the side panels to be inclined inwardly at a predetermined angle in order to inwardly guide flames generated during combustion of fuel,
   wherein each of the side panels comprises:
   a side panel body having a plurality of upper air inflow holes and a plurality of lower air inflow holes formed at upper and lower portions thereof;
   a lower support plate extending inwardly from a lower portion of the side panel body to be horizontal in a predetermined area in order to support the fuel loading part; and
   a pair of side combining wings formed at both sides of the side panel body inwardly to a predetermined height.

3. The self-assembly brazier according to claim 2, wherein each of the fuel loading parts comprises:
   an ashpan held on the lower support plate and having a space formed therein to receive ash; and
   a fuel loading plate arranged at an upper portion of the ashpan so that the fuel is loaded on the upper surface thereof, and having ash discharge holes formed in the plate surface to discharge ash into the ashpan.

4. The self-assembly brazier according to claim 3, further comprising:
   an internal panel detachably joined to the inside of the side panels to induce complete combustion of the fuel; and
   a panel removable jig for applying pressing power so that the internal panel is combined with the side panels,
   wherein a plurality of internal panel combining grooves are perforated in the plate surface of the lower support plate, and
   wherein the internal panel comprises:
   lower fitting protrusions protruding from a lower portion of the internal panel and inserted into the internal panel combining grooves;
   inside air discharge holes perforated in an upper plate surface of the internal panel so that the air introduced into the lower air inflow holes is supplied to the fuel to induce second combustion; and
   jig combining grooves formed at both sides below the inside air discharge holes so that the panel removable jig is inserted into the jig combining grooves, and
   wherein the panel removable jig is joined to the jig combining holes of the internal panel, and the internal panel is pressed toward the side panels and is rotated downwardly, so that an upper end of the internal panel is caught and fixed to the inner face of a lower end of the flame guide plate to be supported.

\* \* \* \* \*